United States Patent [19]

Boudot et al.

[11] 4,149,895
[45] Apr. 17, 1979

[54] GLASS WITH HIGH REFRACTIVE INDEX AND LOW DENSITY

[75] Inventors: Jean E. Boudot; Henri J. Meyer, both of Avon, France

[73] Assignee: Corning Glass Works, Corning, N.Y.

[21] Appl. No.: 941,549

[22] Filed: Sep. 11, 1978

Related U.S. Application Data

[63] Continuation-in-part of Ser. No. 852,746, Nov. 18, 1977, abandoned.

[30] Foreign Application Priority Data

Jul. 1, 1977 [FR] France ................................ 77 20329
Jun. 1, 1978 [FR] France ................................ 78 16433

[51] Int. Cl.² .......................... C03C 3/04; C03C 3/08
[52] U.S. Cl. .................................. 106/52; 106/47 Q; 106/54
[58] Field of Search ..................... 106/47 Q, 52, 54

[56] References Cited

U.S. PATENT DOCUMENTS

| | | | |
|---|---|---|---|
| 3,870,531 | 3/1975 | Jahn | 156/47 Q |
| 4,055,435 | 10/1977 | Sagac | 106/47 Q |

*Primary Examiner*—O. R. Vertiz
*Assistant Examiner*—Mark Bell
*Attorney, Agent, or Firm*—Clinton S. Janes, Jr.

[57] ABSTRACT

The instant invention relates to glasses suitable for optical and ophthalmic applications which can be melted and formed utilizing continuous commercial processes. The glasses exhibit indices of refraction between about 1.675–1.720, densities between about 3.1–3.4 g/cm³, Abbe numbers between about 33–36.5, viscosities at the liquidus temperature of at least about 220 poises, and very high chemical durability as evidenced by a loss of weight of less than 0.01 mg/cm² in the American Optical test. The glasses consist essentially, in weight percent on the oxide basis, of 40–46% $SiO_2$, 0–3% $Al_2O_3$, 40–46% $SiO_2 + Al_2O_3$, 13–17% $TiO_2$, 4–11% $ZrO_2$, 0–2% MgO, 3–7% CaO, 4–8% CaO+MgO, 8–16% BaO, 0–4% SrO, 15–25% CaO+BaO+SrO, 2–10% $Nb_2O_5$, 0–3% $Li_2O$, 2–7% $Na_2O$, 3–8% $K_2O$, 5–12% $Li_2O + Na_2O + K_2O$.

2 Claims, No Drawings

GLASS WITH HIGH REFRACTIVE INDEX AND LOW DENSITY

This application is a continuation-in-part of Ser. No. 852,746, filed Nov. 18, 1977, now abandoned.

BACKGROUND OF THE INVENTION

It has long been recognized that glass having a high refractive index ($n_D$) and low density would be especially desirable in ophthalmic lenses requiring high corrections and in vehicles where it is very important to secure minimum weight. Hence, a low density glass is advantageous either for alleviating the weight for a person wearing a pair of correcting lenses, or for optimizing the useful load:power relation of the vehicle.

The low density, very high refractive index glasses presently known exhibit high dispersion or, expressed differently, have a low Abbe number ($\nu$), i.e., frequently less than 30, with the consequence of iridescence appearing at the sides of the lenses.

OBJECTIVES OF THE INVENTION

The primary objective of the present invention is to produce a low density, high refractive index glass having a relatively high Abbe number such that iridescence at the sides of lenses formed from such a glass will be essentially, if not totally, absent.

More specifically, an objective of this invention is to produce a glass which, while having a high refractive index (a $n_D$ of about 1.7) and a low density (about 3.1 g/cm$^3$), also has a high Abbe number ($\nu > 30$) and demonstrates very good chemical durability, as represented by a loss of weight less than 0.01 mg/cm$^2$ when measured in accordance with a standard acid bath test.

Yet another objective of the instant invention is to produce such a glass which is stable against devitrification and possesses a viscosity at the liquidus temperature of at least about 220 poises.

SUMMARY OF THE INVENTION

We have found that the first two objectives cited above can be accomplished utilizing glass compositions, expressed in weight percent on the oxide basis, falling within the ranges set out below:

| | |
|---|---|
| SiO$_2$ | 38–45 |
| TiO$_2$ | 8–18 |
| ZrO$_2$ | 0–10 |
| BaO | 8–16 |
| CaO | 4–12 |
| SrO | 0–12 |
| BaO + CaO + SrO | 5–25 |
| Nb$_2$O$_5$ | 3–15 |
| Na$_2$O | 0–10 |
| K$_2$O | 0–10 |
| Li$_2$O | 0–15 |
| Na$_2$O + K$_2$O + Li$_2$O | 5–15 |
| Al$_2$O$_3$ | 0–5 |
| MgO | 0–6 |
| La$_2$O$_3$ | 0–8 |
| ZnO | 0–8 |
| Ta$_2$O$_5$ | 0–6 |
| Al$_2$O$_3$ + MgO + La$_2$O$_3$ + ZnO + Ta$_2$O$_5$ | $\leq 20$ |

However, difficulties have arisen when such glasses were melted commercially in large quantities in continuous melting units, e.g., tank melting units. Thus, in order for such a glass to be capable of manufacture on an industrial scale in a continuous melting tank and to be utilized at the outlet of the tank by molding or other forming machines, e.g., in making ophthalmic lens blanks, the glass must not devitrify, since devitrification renders the glass useless for ophthalmic applications, and it must possess a viscosity suitable for forming. Generally, a glass viscosity of at least about 220 poises and, preferably, at least 250 poises has been considered necessary since a molten glass which is too liquid is not suitable for machine forming. In order to meet these requirements, it appears necessary for the glass to have a viscosity at the liquidus temperature, viz., the temperature at which molten glass begins to crystallize when it is cooled, of at least about 220 poises and, preferably, at least about 250 poises such that it can be formed at a temperature slightly higher than the liquidus temperature without risk of divitrification.

Only a very limited segment of the above-cited composition ranges will satisfy the additional requirements demanded for forming glass shapes of desired geometries via continuous commercial melting and forming techniques.

Accordingly, we have discovered that glasses can be produced having indices of refraction varying between 1.675–1.720, densities within the interval of 3.1–3.4 g/cm$^3$, Abbe numbers between 33–36.5, and which demonstrate very good chemical durability, as represented by a loss of weight of less than 0.01 mg/cm$^2$ when measured in the American Optical test, from compositions consisting essentially, as expressed in weight percent on the oxide basis, of

| | |
|---|---|
| SiO$_2$ | 40–46 |
| Al$_2$O$_3$ | 0–3 |
| SiO$_2$ + Al$_2$O$_3$ | 40–46 |
| TiO$_2$ | 13–17 |
| ZrO$_2$ | 4–11 |
| MgO | 0–2 |
| CaO | 3–7 |
| BaO | 8–16 |
| SrO | 0–4 |
| CaO + MgO | 4–8 |
| CaO + BaO + SrO | 15–25 |
| Nb$_2$O$_5$ | 2–10 |
| Li$_2$O | 0–3 |
| Na$_2$O | 2–7 |
| K$_2$O | 3–8 |
| Li$_2$O + Na$_2$O + K$_2$O | 5–12 |

The American Optical test is the standard acid bath test for ophthalmic applications and consists in determining the decrease in weight of a glass disc, the physical dimensions of which have been carefully measured, after complete immersion thereof for 10 minutes in an aqueous 10% by weight HCl solution at a temperature of 25° C. (The test has been described in *Applied Optics Review*, 7, No. 5, p. 847, May, 1968). A weight loss of <0.5 g/cm$^2$ is deemed to successfully pass the test.

The above-cited limited range of operable compositions is particularly interesting from a practical point of view in that the content of Nb$_2$O$_5$ in the glass is low, thereby keeping the cost of manufacturing such glasses low.

PRIOR ART

U.S. Pat. No. 2,554,952 describes the addition of TiO$_2$ to soda lime base glass to increase the refractive index thereof ($n_D \simeq 1.6$) with the accompanying addition of BaO, MgO, and K$_2$O to minimize the development of yellow coloration. The exemplary compositions reported are relatively high in SiO$_2$ and free from Nb$_2$O$_5$.

U.S. Pat. No. 3,513,004 discloses stable, chemically durable, optical glasses ($n_D \simeq 1.8$) containing $B_2O_3$, $SiO_2$, $TiO_2$, $BaO$, $La_2O_3$, $ZrO_2$, and $Ta_2O_5$ as essential constituents. Optional ingredients include $Nb_2O_3$, $CaO$, and alkali metal oxides. The illustrative examples recorded are relatively high in $B_2O_3$, $BaO$, and $La_2O_3$, and low in $SiO_2$, $Nb_2O_5$, $CaO$, and total alkali.

U.S. Pat. No. 3,536,504 discusses devitrification-resistant, chemically durable, optical glasses ($n_D \simeq 1.8$, $\nu \simeq 35+$) of the $BaO-La_2O_3-B_2O_3-SiO_2$ type. $TiO_2$, $Ta_2O_5$, and $ZrO_2$ are remarked as being required ingredients, whereas $CdO$, $PbO$, $Bi_2O_3$, and $WO_3$ are individually optional, but one or more of the group is demanded in the overall composition. The $SiO_2$ content is quite low and $Nb_2O_5$ is not mentioned for the inventive glasses.

U.S. Pat. No. 3,870,531 describes devitrification-resistant, chemical durable, optical glasses ($n_D \simeq 1.7$) with relatively low dispersion ($\nu \leq 32$). The glasses are based upon the capability of $Nb_2O_5$ and/or $Ta_2O_5$ to inhibit the development of a yellow coloration in $R_2O-TiO_2-SiO_2$ glasses. No alkaline earth metal oxides are employed.

U.S. Pat. No. 3,898,093 discloses low density ($\leq 3$ g/cm$^3$), high refractive index ($n_D \simeq 1.7$), and relatively low dispersion ($\nu \leq 32$) optical glasses for ophthalmic use which contain $B_2O_3$, $SiO_2$, $TiO_2$, $ZrO_2$, and the alkali metal oxides as necessary components, and $CaO$, $ZnO$, $Nb_2O_5$, and $SrO$ as preferred optional ingredients. The $TiO_2$ contents are shown to be quite high.

U.S. Pat. No. 4,055,435 is directed to glasses suitable for optical and ophthalmic applications which are asserted to have refractive indices greater than 1.69, specific gravities of not more than 3.2, Abbe numbers in excess of 39, and good resistance to acid attack. Two base composition fields are disclosed as being operable.

The first field of compositions consists essentially, in weight percent on the oxide basis, of the following ranges:

| | |
|---|---|
| $SiO_2$ | 20–42 |
| $Al_2O_3$ | 5–13 |
| $B_2O_3$ | 0–20 |
| $SiO_2 + Al_2O_3 + B_2O_3$ | 42–52 |
| $CaO$ | 12–39 |
| $MgO$ | 0–20 |
| $CaO + MgO$ | 12–39 |
| $TiO_2$ | 5–13 |
| $ZrO_2$ | 0–7 |
| $Nb_2O_5$ | 0–15 |
| $TiO_2 + ZrO_2 + Nb_2O_5$ | 15–28 |
| $BaO$ | 0–6 |
| $SrO$ | 0–10 |
| $ZnO$ | 0–15 |
| $BaO + SrO + ZnO$ | 0–15 |
| $La_2O_3$ | 0–10 |
| $Ta_2O_5$ | 0–6 |
| $WO_3$ | 0–10 |
| $La_2O_3 + Ta_2O_5 + WO_3$ | 0–10 |

Several obvious differences separate those glasses from the inventive glasses. First, the patented glasses are free from alkali metal oxides. Second, the $CaO$ and $Al_2O_3$ contents of the patented glasses are far higher than those of the inventive glasses. Third, the $TiO_2$ content of the patented glass is lower than that of the inventive glasses. Fourth, the $BaO$ content of the patented glasses is lower than that of the inventive glasses.

The second field of patented compositions consists essentially, in weight percent on the oxide basis, of the following ranges:

| | |
|---|---|
| $SiO_2$ | 20–52 |
| $Al_2O_3$ | 0–13 |
| $B_2O_3$ | 0–20 |
| $SiO_2 + Al_2O_3 + B_2O_3$ | 40–52 |
| $CaO$ | 1–35 |
| $MgO$ | 0–20 |
| $CaO + MgO$ | 10–35 |
| $Li_2O$ | 0–15 |
| $Na_2O + K_2O$ | 0–15 |
| $Li_2O + Na_2O + K_2O$ | 1–20 |
| $ZrO_2$ | 0–11 |
| $TiO_2$ | 4–14 |
| $Nb_2O_5$ | 0–20 |
| $ZrO_2 + TiO_2 + Nb_2O_5$ | 14–30 |
| $BaO$ | 0–8 |
| $SrO$ | 0–12 |
| $ZnO$ | 0–15 |
| $BaO + SrO + ZnO$ | 0–15 |
| $La_2O_3$ | 0–12 |
| $Ta_2O_5$ | 0–10 |
| $WO_3$ | 0–15 |
| $La_2O_3 + Ta_2O_5 + WO_3$ | 0–15 |

Such ranges are considerably broader than those in the first field of compositions. However, the inventive glasses are outside of the patented compositions with respect to the $CaO+MgO$ content and the operable quantity of $BaO$. Moreover, and very importantly, the narrow ranges of compositions underlying the inventive glasses were drawn to such that could be readily melted and formed utilizing conventional continuous production techniques. Nowhere does the patent address that problem so nowhere is there any suggestion as to which compositions could be selected from those broad ranges to yield glasses having viscosities at the liquidus temperature of at least about 220 poises.

German Pat. No. 556,895 discusses glasses having base compositions within the $K_2O-TiO_2-SiO_2$ system which also contain an alkaline earth metal oxide or $PbO$, and exhibit indices of refraction ranging between 1.66–1.745. In the exemplary compositions provided, the individual constituents varied as follows, in weight percent on the oxide basis: 13–25.2% $K_2O$, 22.4–44% $TiO_2$, and 27.1–42.4% $SiO_2$. $CaO$ was present as 3.7–10.2%, $PbO$ as 13.5–31%, and $BaO$ in a single example as 23.8%. $Nb_2O_5$ is nowhere mentioned in the patent.

In contrast to $BaO$, the use of $CaO$ and $MgO$ permits a glass to be produced having a high refractive index without increasing the density thereof. However, excessive amounts of those ingredients hazard devitrification.

$TiO_2$ imparts good chemical resistance to the glass and $Al_2O_3$ and $ZnO$ perform as stabilizing agents. Other constituents which enter into the composition, e.g. $Nb_2O_5$, $ZrO_2$, and $SiO_2$, act to modify the melting and forming character of the glass and make the glass more resistant to chemical attack. The alkali metal oxides $Li_2O$, $Na_2O$, and $K_2O$ have a beneficial effect upon the density of the glass. Furthermore, the inclusion of $Li_2O$ and $Na_2O$ in the glass composition allows the glass to be strengthened via chemical tempering, i.e., through an ion exchange reaction, if additional strength is desired. On the other hand and particularly for reasons of economy, the amount of $Nb_2O_5$ can be decreased and the amount of $TiO_2$ increased proportionately.

Where wanted, the introduction of the usual complementary additives such as decolorizing agents and fining agents, e.g., $As_2O_3$, $Sb_2O_3$, nitrates, fluorides, chlorides, bromides, and iodides, is possible in the customary proportions (generally below about 2% in total). Up to about 5% of $B_2O_3$ can also be included, if desired.

Finally, if thought necessary or desirable, other components may be included in minor amounts to improve the melting and forming capabilities of the glass or, even more importantly, to enhance the resistance of the glass to devitrification.

DESCRIPTION OF PREFERRED EMBODIMENTS

The following table records glass compositions illustrating the parameters of the instant invention, as expressed in parts by weight on the oxide basis. Inasmuch as the sum of the several ingredients totals or approximately totals 100, for all practical purposes the individual values reported can be deemed to represent weight percent. The glasses can be prepared in the conventional manner. For example, the batch ingredients (oxides or other compounds which are thermally converted to oxides like carbonates) are mixed together in such proportions that the resulting glass has the desired composition. The batch materials are then placed into a platinum crucible for laboratory melting. It will be recognized that large scale commercial production would use pots or continuous melting tanks. The batches are melted at about 1500° C. with stirring to homogenize the melt. The molten glass is thereafter poured into a mold which is then immediately transferred to an annealer.

The table below also records measurements conducted on the individual examples utilizing means conventional to the glass art of $n_D$, $v$, density (g/cm$^3$), and the viscosity (in poises) of the molten glass at the liquidus temperature. An average weight loss of about 0.01 mg/cm$^2$ was measured on the samples employing the American Optical test.

TABLE

|  | 1 | 2 | 3 | 4 | 5 |
|---|---|---|---|---|---|
| SiO$_2$ | 42.6 | 45.5 | 44 | 41.8 | 43.8 |
| Al$_2$O$_3$ | — | — | 1.3 | — | — |
| TiO$_2$ | 15.2 | 16 | 15 | 15.9 | 13.5 |
| ZrO$_2$ | 8.5 | 4 | 5.2 | 6.2 | 6.2 |
| MgO | — | — | — | — | 0.5 |
| CaO | 5 | 5 | 5 | 6.0 | 6.3 |
| BaO | 14.2 | 12.4 | 12 | 8.8 | 12 |
| SrO | 0.5 | 2 | 2.5 | 4 | — |
| Nb$_2$O$_5$ | 5.5 | 6 | 6 | 9 | 9.4 |
| Li$_2$O | — | — | — | — | 0.5 |
| Na$_2$O | 3.5 | 2 | 2 | 4.7 | 4.7 |
| K$_2$O | 5 | 7.1 | 7 | 3.6 | 3.1 |
| $n_D$ | 1.7 | 1.678 | 1.68 | 1.71 | 1.69 |
| $v$ | 34.3 | 35.2 | 35.1 | 33.2 | 34.5 |
| density | 3.2 | 3.1 | 3.1 | 3.2 | 3.15 |
| liquidus viscosity | 250 | 600 | 550 | 220 | 250 |

Although the above exemplary compositions were melted in the laboratory, large scale commercial manufacture of the glasses can be conducted in the conventional manner and, consequently, no description of such a process is required here.

We claim:

1. A glass having a refractive index between about 1.675–1.720, a density between about 3.1–3.4 g/cm$^3$, an Abbe number between about 33–36.5, a viscosity at the liquidus temperature of at least 220 poises, and excellent resistance to acid attack, as measured in the American Optical test, consisting essentially, in weight percent on the oxide basis, of

| SiO$_2$ | 40–46 |
|---|---|
| Al$_2$O$_3$ | 0–3 |
| SiO$_2$ + Al$_2$O$_3$ | 40–46 |
| TiO$_2$ | 13–17 |
| ZrO$_2$ | 4–11 |
| MgO | 0–2 |
| CaO | 3–7 |
| BaO | 8–16 |
| SrO | 0–4 |
| CaO + MgO | 4–8 |
| CaO + BaO + SrO | 15–25 |
| Nb$_2$O$_5$ | 2–10 |
| Li$_2$O | 0–3 |
| Na$_2$O | 2–7 |
| K$_2$O | 3–8 |
| Li$_2$O + Na$_2$O + K$_2$O | 5–12 |

2. A glass according to claim 1 which also contains up to 5% $B_2O_3$.

* * * * *

UNITED STATES PATENT AND TRADEMARK OFFICE
CERTIFICATE OF CORRECTION

PATENT NO. : 4,149,895

DATED : April 17, 1979

INVENTOR(S) : Jean E. Boudot and Henri J. Meyer

It is certified that error appears in the above–identified patent and that said Letters Patent are hereby corrected as shown below:

Column 1, line 55, change "0-15" to --0-5--.

Signed and Sealed this

Twenty-third Day of October 1979

[SEAL]

Attest:

RUTH C. MASON
Attesting Officer

LUTRELLE F. PARKER
Acting Commissioner of Patents and Trademarks